United States Patent
Bendinelli et al.

[11] Patent Number: 6,061,719
[45] Date of Patent: May 9, 2000

[54] SYNCHRONIZED PRESENTATION OF TELEVISION PROGRAMMING AND WEB CONTENT

[75] Inventors: Samuel J. Bendinelli, Montgomery; Venkatesh Krishnaswamy, Holmdel, both of N.J.

[73] Assignee: Lucent Technologies Inc., Murray Hill, N.J.

[21] Appl. No.: 08/965,633

[22] Filed: Nov. 6, 1997

[51] Int. Cl.[7] .................................................. H04N 7/10
[52] U.S. Cl. .......................................... 709/218; 348/12
[58] Field of Search ................................... 370/522, 502, 370/523, 524; 395/200.48; 348/12, 731, 564, 565, 13, 906; 455/6.3; 709/218

[56] References Cited

U.S. PATENT DOCUMENTS

| | | |
|---|---|---|
| 4,264,924 | 4/1981 | Freeman . |
| 4,493,339 | 1/1985 | Birch et al. . |
| 4,602,279 | 7/1986 | Freeman . |
| 4,885,775 | 12/1989 | Lucas . |
| 4,894,789 | 1/1990 | Yee . |
| 4,924,303 | 5/1990 | Brandon et al. . |
| 4,954,882 | 9/1990 | Kamemoto . |
| 5,008,750 | 4/1991 | Gomikawa . |
| 5,148,272 | 9/1992 | Acampora et al. . |
| 5,369,669 | 11/1994 | Tombal et al. . |
| 5,446,919 | 8/1995 | Wilkins . |
| 5,508,733 | 4/1996 | Kassatly . |
| 5,541,638 | 7/1996 | Story . |
| 5,550,863 | 8/1996 | Yurt et al. . |
| 5,555,025 | 9/1996 | McArthur . |
| 5,568,181 | 10/1996 | Greenwood et al. . |
| 5,585,858 | 12/1996 | Harper et al. . |
| 5,619,247 | 4/1997 | Russo . |
| 5,657,072 | 8/1997 | Aristides et al. . |
| 5,699,124 | 12/1997 | Nuber et al. . |
| 5,701,582 | 12/1997 | DeBey . |
| 5,721,815 | 2/1998 | Ottesen et al. . |
| 5,721,829 | 2/1998 | Dunn et al. . |
| 5,724,091 | 3/1998 | Freeman et al. . |
| 5,724,103 | 3/1998 | Batchelor . |
| 5,734,413 | 3/1998 | Lappington et al. . |
| 5,734,432 | 3/1998 | Netravali et al. . |
| 5,774,664 | 6/1998 | Hidary ............................... 348/12 |
| 5,778,181 | 7/1998 | Hidary ........................ 395/200.48 |
| 5,844,552 | 12/1998 | Gaughan ........................... 348/12 |
| 5,850,218 | 12/1998 | LaJoei .............................. 348/13 |
| 5,903,816 | 5/1999 | Broadwin ......................... 348/565 |

FOREIGN PATENT DOCUMENTS

3717261 A1  of 0000  Germany .

*Primary Examiner*—Ajit Patel
*Assistant Examiner*—Ricardo M. Pizarro

[57] ABSTRACT

Uniform Resource Locators (URLs) or other network information identifiers are transmitted with television signals in order to permit web content to be displayed in synchronization with television programming. In an illustrative embodiment, URLs are embedded in a closed caption portion of a transmitted television signal, and delimited from the closed caption text using predetermined delimiting characters. A decoder extracts the URLs from the television signal, and supplies the URLs to a retrieval device which automatically retrieves corresponding web pages or other similar information over a network. The retrieved web pages are then displayed to a viewer in synchronization with related programming in the television signal. The retrieval device may be a set-top box associated with a television set that displays both a retrieved web page and the corresponding television picture portion of the television signal. Alternatively, the retrieval device may be a computer which retrieves and displays a web page, while the corresponding television picture is displayed on a television set.

35 Claims, 2 Drawing Sheets

SYNCHRONIZED PRESENTATION OF TELEVISION PROGRAMMING AND WEB CONTENT

FIELD OF THE INVENTION

The present invention relates generally to techniques for integrating television and computer systems, and more particularly to techniques for presenting World Wide Web content or other computer network information to viewers in conjunction with television programming.

BACKGROUND OF THE INVENTION

It is not uncommon for television programming transmitted to viewers to include Internet web addresses or other information that the viewers can use to access additional information related to the programming. For example, television advertisements often include Uniform Resource Locators (URLs) which identify the web site of the advertising company. Similarly, television news programs and televised events often display URLs which identify web sites corresponding to the respective programs and events. Under current practice, a viewer desiring to access a URL displayed in a television program must either write down the URL or attempt to remember it. The viewer then must enter the URL in a browser program on their personal computer in order to access the corresponding web site. This can be inconvenient and frustrating for the viewer.

Although systems have been developed recently which allow viewers to access web sites from a television using a television set-top box, such systems typically operate in a manner similar to web browsers on personal computers. As a result, such systems are generally unable to extract a URL from a televised program such that the viewer need not reenter it to access the corresponding web site. Furthermore, such systems are unable to present web content to a viewer in synchronization with television programming which includes the corresponding URLs. For example, even a viewer which has a computer and a television in close proximity must continually enter the televised URLs in order to view a sequence of web content related to the television programming.

SUMMARY OF THE INVENTION

The invention utilizes URLs or other network information identifiers transmitted with television signals in order to permit web content to be displayed in synchronization with related television programming. In an illustrative embodiment, URLs are embedded in a closed caption portion of a transmitted television signal, and delimited from the closed caption text using predetermined delimiting characters. A decoder extracts the URLs from the television signal, and supplies the URLs to a retrieval device which automatically retrieves corresponding web pages or other similar information over a network. The picture portion of the television signal is supplied to a conventional television set, and the retrieved web pages are displayed to a viewer in synchronization with the television programming. A viewer therefore no longer needs to manually enter televised URLs into a web browser or similar network access program. Instead, web content corresponding to the embedded URLs is automatically retrieved and displayed to the viewer as the television programming progresses. For example, as the television programming moves from one advertisement or program to another, the embedded URL will change, such that a new web site is accessed and the corresponding web page displayed to the viewer when the new advertisement or program is displayed on the television set. If a given displayed web page is of particular interest to a viewer, the viewer can select that web page for continuous display, in which case the synchronized presentation of web content is disabled until the viewer elects to resume it.

In one embodiment of the invention, the retrieval device may be a set-top box associated with the television set, such that the television set displays both a retrieved web page and the television picture portion of the television signal. The set-top box, which may include the above-noted decoder, establishes a connection over the network with a server that delivers a web page for display on the television set with the picture portion of the television signal. The retrieved web page may be displayed on the television set simultaneously with the picture portion of the television signal, using a picture-in-picture (PIP) type arrangement, or a viewer may be permitted to select between display of a retrieved web page and display of the picture portion of the television signal. In another embodiment of the invention, the retrieval device may be a computer which retrieves and displays a web page specified by an embedded URL, while the corresponding picture portion of the television signal is displayed on the television set. In yet another embodiment of the invention, the retrieval device may be a television tuner card within a computer. A television picture generated by the tuner card is then displayed in one window on the computer monitor, while a web page specified by a URL embedded in the television signal is displayed in another window on the monitor.

DETAILED DESCRIPTION OF THE INVENTION

The invention will be described below in conjunction with a number of illustrative embodiments for displaying web content in conjunction with related television programming. The invention is not limited to use in these embodiments, but is instead more generally applicable to any system in which it is desirable to transmit, in conjunction with television programming, Uniform Resource Locators (URLs) or other identifiers which specify web sites or other sources of computer network information. The term "network information identifier" as used herein should be understood to include URLs as well as any other type of network information identifier. The term "web" as used herein is intended to include not only the World Wide Web portion of the Internet, but also other portions of the Internet as well as other types of computer networks including intranets and extranets. The term "web site" should be understood to include any source of information which can be specified by a URL or other type of network information identifier. The term "television signal" as used herein is intended to include analog video signals in accordance with NTSC, PAL or other standard formats, digital video signals including MPEG-encoded signals, high definition television (HDTV) signals, and any other type of image signal which may be supplied to a receiver via broadcast airwaves, cable network, satellite network, computer network or any other type of signal distribution mechanism. The term "automatically" as used herein in conjunction with retrieval of information over a network includes the retrieval of such information without the need for further intervention from a viewer.

Figure 1:
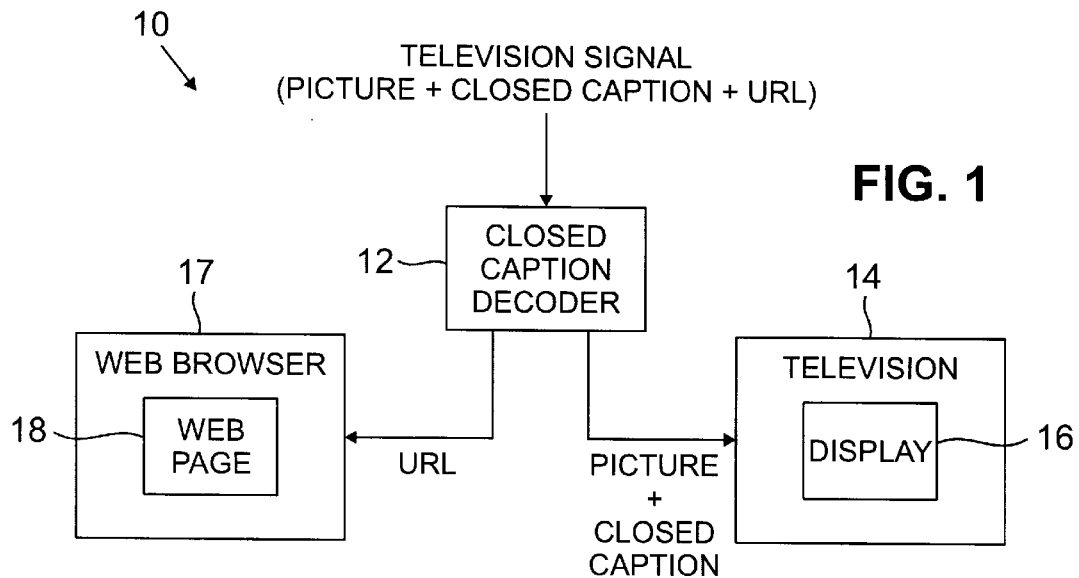
FIG. 1 illustrates an exemplary embodiment of the invention in which a closed caption decoder is used to extract a Uniform Resource Locator (URL) or other network information identifier transmitted in a closed caption portion of a television signal.

FIG. 1 shows a system 10 for implementing presentation of web content in conjunction with related television programming in accordance with the invention. The system 10 includes a closed caption decoder 12 and a television 14. A television signal transmitted from a broadcast transmitter includes a video or "picture" portion, a closed caption text stream, and one or more URLs. The URLs are transmitted so as to coincide with the television programming represented by the picture portion of the signal. For example, when the programming corresponds to an advertisement, the corresponding transmitted URL may identify a web site of the company or product being advertised. Similarly, news programming may be transmitted with URLs identifying one or more web sites which describe various news items in greater detail, and music video programming may be transmitted with URLs identifying web sites of the recording company, artist or studio associated with the music video. Numerous other relationships between the transmitted programming and URLs are of course possible. The television signal may be received in the system 10 in a conventional manner via an antenna, cable network, satellite receiver or other type of conventional signal reception device, and is applied to an input of the closed caption decoder 12 as shown.

The URLs may be transmitted as strings embedded in the closed caption text stream of the television signal. A given URL string transmitted in this manner may be delimited by a known character, or set of characters, that appears in the closed caption text stream before and after the URL string. For example, brackets or quotes may be used as delimiting characters for a URL string. The decoder 12 includes appropriate hardware or software logic functions for extracting URLs from the closed caption stream. In the exemplary system 10 of FIG. 1, the picture and closed caption text stream are supplied to the television 14 and displayed on the display 16 in a conventional manner. It should be noted that an extracted URL may also be supplied from the decoder 12 to the television 14, such that it is displayed to a viewer along with the programming to which it corresponds. Such a display of the URL on the television 14 will generally be in an area of the display 16 separate from that used for the closed caption text. It should also be emphasized that although the FIG. 1 embodiment illustrates the invention in conjunction with the use of closed caption text, the invention does not require the use of closed caption text.

The extracted URLs from the decoder 12 are applied as inputs to a web browser program 17. The web browser program 17 uses a given extracted URL to establish a connection over a network for accessing the web site identified by the extracted URL. A web page 18 associated with the web site identified by the extracted URL is then displayed by the web browser 17. As will be described in greater detail in conjunction with FIGS. 3 and 4 below, the web browser 17 may be implemented using a set-top box connected to the television 14, such that web page 18 is displayed in a portion of the television display 16, or may be implemented using a computer with an Internet connection or other suitable network connection, such that the web page 18 is displayed on a display screen of the computer. The web pages associated with the URLs extracted from the television signal may be displayed in synchronization with the corresponding television programming, such that the displayed web page changes each time a different URL is extracted from the closed caption text stream by decoder 12. As noted previously, the embodiment of FIG. 1 does not require the use of a closed caption decoder. Alternative embodiments may use any other type of decoder which is capable of extracting a URL from a transmitted television signal.

Figure 2:
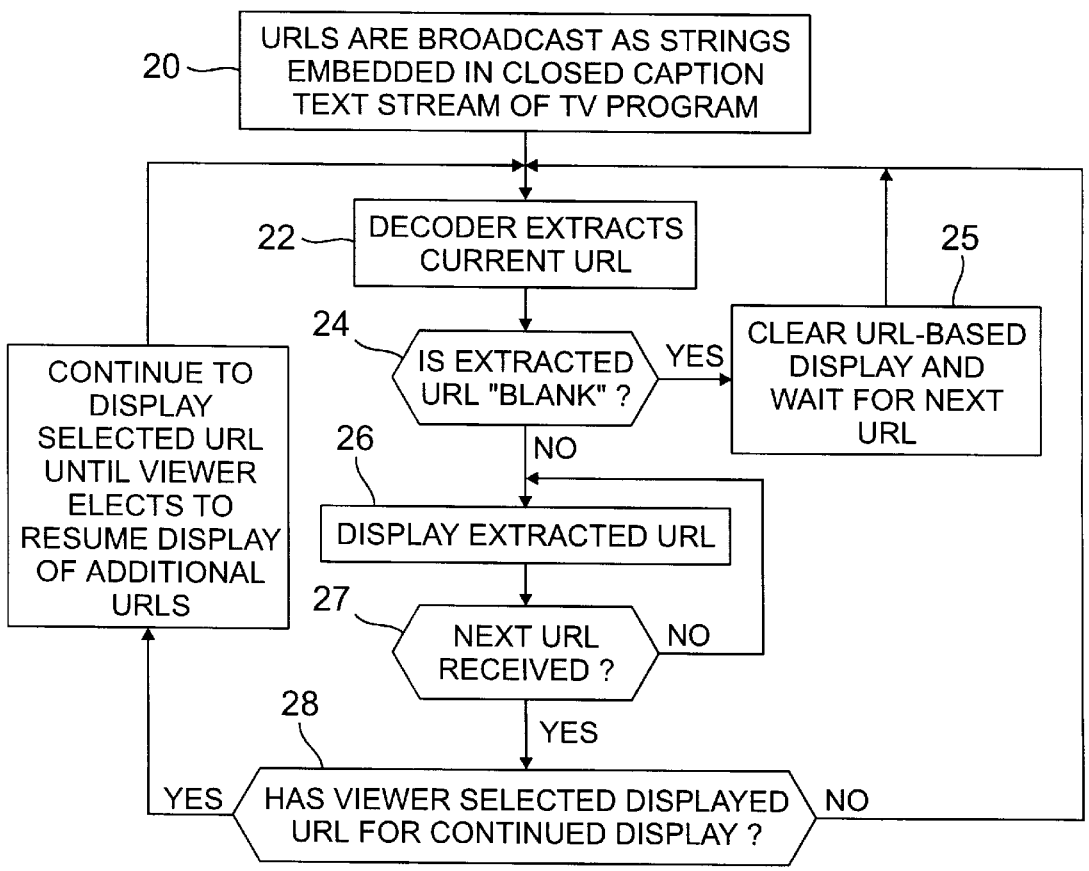
FIG. 2 is a flow diagram illustrating a URL detection and display process in accordance with the invention.

FIG. 2 is a flow diagram illustrating the operation of the system 10 of FIG. 1 in greater detail. Step 20 indicates that URLs are broadcast as strings embedded in a closed caption text stream associated with a television program. In step 22, the closed caption decoder 12 of FIG. 1 extracts a current URL from a television signal applied thereto. The current URL refers generally to the latest URL received by the decoder 12. In step 24, a determination is made as to whether or not the current URL extracted in step 22 corresponds to a "blank" URL. A blank URL in accordance with the invention is a specified URL or other suitable code which indicates that the associated URL will not be displayed or used to access a web site. When a blank URL is received, step 25 indicates that the URL-based part of the display, for example, the web page 18 displayed by the web browser program 17, is cleared, and the FIG. 2 process then waits until the next URL is received. As noted previously, the URL itself may also be displayed along with the television picture on display 16 of television 14. In such an implementation, clearing the URL-based part of the display will also clear the URL from the television display. Upon receipt of the next URL, the process will return to step 22 to extract that URL as the current URL.

If the URL extracted in step 22 is not a blank URL, that URL is used to access a web page which is displayed in step 26. The web page corresponding to the current URL may be displayed continuously until the next URL is received in the decoder 12. In step 27, a determination is made as to whether the next URL has been received. If the next URL has not yet been received, the display based on the previously-extracted URL continues in step 26 until the next URL is received. If the next URL has been received, a determination is made in step 28 as to whether the viewer has selected the current URL displayed in step 26 for continued display. The viewer may select this continued display mode for a given displayed URL if that URL is of particular interest to the viewer. This allows the viewer to turn off the ongoing display of transmitted URLs in order to focus on the URL of particular interest.

If the viewer has selected the current displayed URL for continued display, step 29 indicates that this selected URL, as well as its associated web content, is displayed to the viewer until the viewer elects to resume display of additional URLs in synchronization with the displayed television programming. If it is determined in step 28 that the viewer has not selected the current URL displayed in step 26 for continued display, the process returns to step 22. The decoder 12 then extracts the next URL from the closed caption text stream, this extracted URL becomes the current URL, and the displayed web content is updated in accordance with steps 24, 25 and 26. A viewer is thus able to view web content related to television programming on the television 14 without ever having to enter a URL into a web browser program. As the television programming progresses, the transmitted lURLs change, and the displayed web content also changes accordingly, without any input required from the viewer. As previously noted, a viewer can elect to continue the display of any transmitted URL and its corresponding web content if that URL is of particular interest to the viewer.

Figure 3:
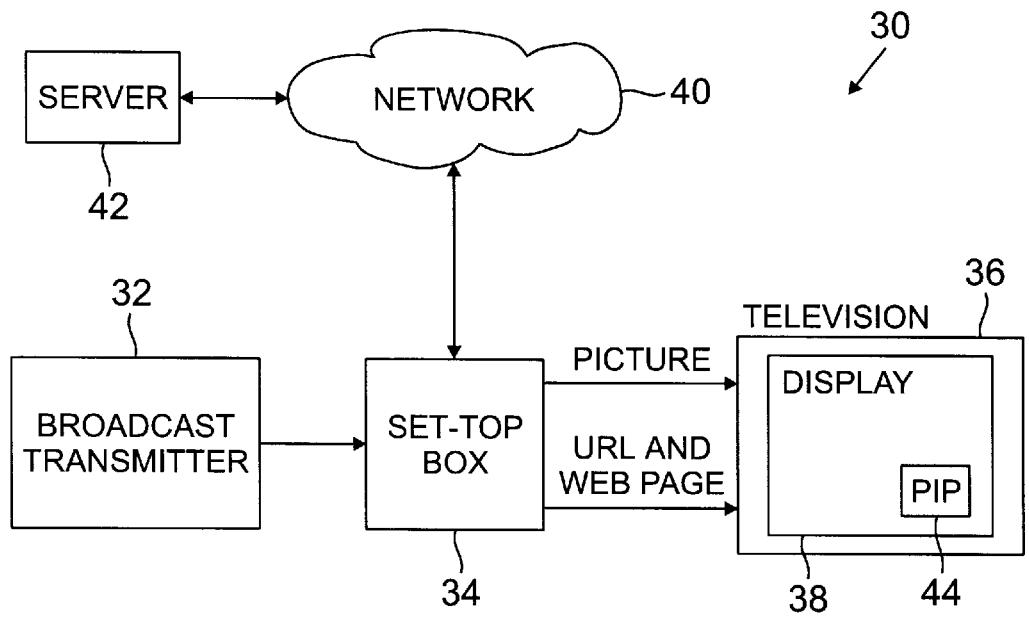
FIG. 3 illustrates an embodiment of the invention in which a set-top box is used to display web content on a television display based on a URL or other network information identifier extracted from a television signal.
Figure 4:
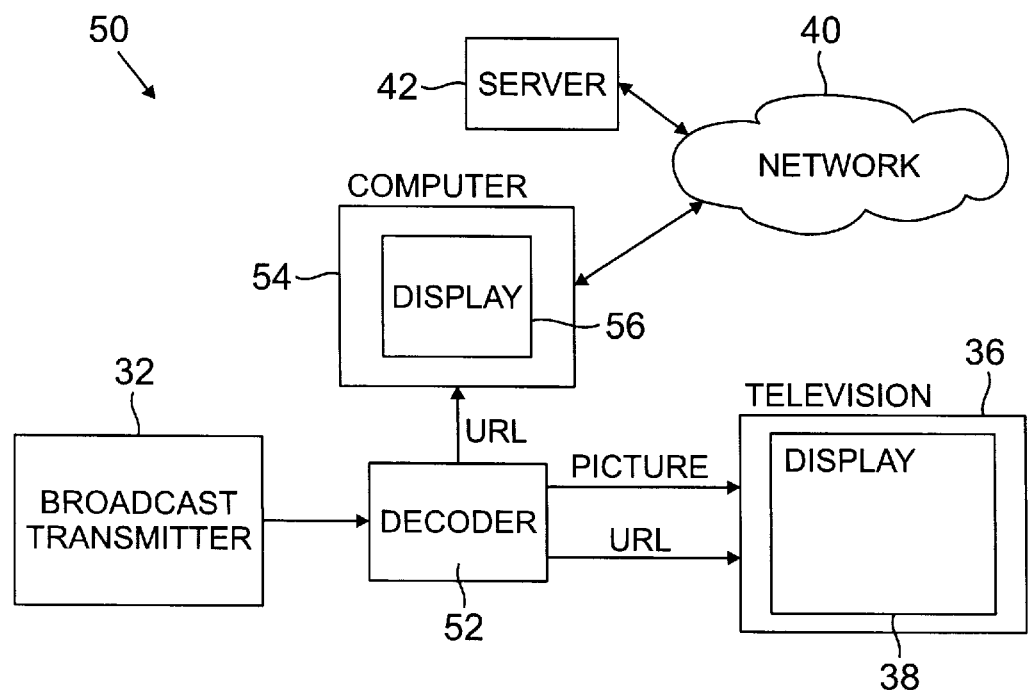
FIG. 4 illustrates an embodiment of the invention in which a computer is used to display web content based on a URL or other network information identifier extracted from a television signal.

FIGS. 3 and 4 illustrate two exemplary implementations of a system such as that described in conjunction with FIGS. 1 and 2. FIG. 3 shows a system 30 in which a broadcast transmitter 32 embeds URLs in television signals transmitted to viewers. As noted above, such a television signal may be received via an antenna, a cable network, a satellite receiver or other suitable receiving equipment. The set-top box 34 receives the television signal and the URLs embedded therein, and utilizes an internal decoder to extract the embedded URLs. This internal decoder may, but need not, be a closed caption decoder such as decoder 12. Any decoder suitable for detecting a transmitted URL or other transmitted network information identifier may be used. The set-top box 34 in this embodiment includes an internal telephone line modem, a cable modem or other similar device suitable for establishing a network connection with a network 40. The network 40 may be, for example, the Internet or any other computer, cable or satellite network as well as various portions or combinations thereof. The set-top box 34 may also implement a web browser program or other suitable network access software. The set-top box 34 uses the web browser program and the internal modem to establish a connection via network 40 to a server 42 corresponding to a given extracted URL. The server 42 then delivers a web page specified by the extracted URL to the set-top box 34 over the network 40.

The set-top box 34 delivers the picture portion of the television signal to a television 36, for display in a main area of the television display 38. The set-top box 34 also delivers the extracted URL, and the corresponding web page retrieved from server 42, to the television 36. In this embodiment, the television display 38 includes a picture-in-picture (PIP) area 44 which is used to display the retrieved web page simultaneously with the picture portion. The set-top box 34 or television 36 may also be configured to allow a viewer to switch between a variety of different types of displays, such as a display of only the picture portion, a display of only the web page, or a display in which the picture portion is in the PIP area 44 and the retrieved web page is in a main area of the display. Numerous other types of displays are also possible. The web browser software implemented by set-top box 34 may be configured to allow a viewer to visit a variety of web sites other than that corresponding to the current URL. For example, the set-top box 34 may be configured to store a list of recently-extracted URLs, such that a viewer can select display of a given web page from either the current URL or from some other recently-extracted URL. Viewer commands and other control information may be entered in a conventional manner using a remote control, keyboard, mouse or similar input device.

FIG. 4 shows a system 50 in which URLs are embedded in a television signal transmitted from broadcast transmitter 32 as previously described. A decoder 52 receives the television signal, extracts an embedded URL, and delivers it over a serial connection or other suitable connection to a computer 54. The computer 54 runs a web browser program which uses the extracted URL from the decoder 52 to establish a connection with server 42 over network 40 in a manner similar to that described in conjunction with FIG. 3. The server 42 delivers a web page specified by the extracted URL to the computer 54, and the web page is displayed on a display 56 of the computer 54. The decoder 52 supplies the picture portion of the television signal along with the extracted URL to the television 36. The television display 38 displays the picture portion of the television signal as well as the extracted URL. A viewer using system 50 can thus view programming on the television 36 while simultaneously viewing related web content on the computer 54. As in the previous embodiments, the displayed web content changes in synchronization with the URLs transmitted in the television signal.

Alternative embodiments of the invention may utilize different mechanisms for delivering URLs or other network information identifiers in conjunction with related television programming. For example, although the illustrative embodiment of FIGS. 1 and 2 use URLs embedded in a closed caption text stream, other embodiments of the invention could incorporate the URLs into another portion of a transmitted television signal, such as onto a subcarrier or other signal associated with the television signal. It is also possible to transmit the URLs on another signal which is only roughly synchronized with the television signal. The URLs therefore need not be embedded in the transmitted television signal itself. Moreover, the URLs could be encoded or otherwise processed in any suitable manner prior to transmission rather than transmitted in a manner similar to that used to transmit closed-caption text. Furthermore, a variety of configurations other than those described in FIGS. 1 through 4 may be used for extracting URLs and displaying corresponding web content in accordance with the invention. For example, the invention may be implemented using a computer which includes a television tuner card, such that the television picture generated by the tuner card is displayed in one window on the computer monitor, while a web page specified by a URL embedded in the television signal is displayed in another window of the monitor. These and numerous other alternative embodiments within the scope of the following claims will be apparent to those skilled in the art.

What is claimed is:

1. A method of accessing information over a computer network, comprising the steps of:

receiving at least one network information identifier transmitted with a television signal;

supplying the network information identifier to a device which utilizes the network information identifier to automatically retrieve information over the network, such that the retrieved information is displayed to a viewer in conjunction with related programming in the television signal; and allowing the viewer to select continued display of currently-displayed retrieved information corresponding to a particular network information identifier, wherein selection of continued display of the currently-display retrieved information automatically interrupts display of additional retrieved information corresponding to at least one subsequently received network information identifier.

2. The method of claim 1 wherein the network information identifier is a Uniform Resource Locator (URL) identifying a web site.

3. The method of claim 1 wherein the receiving step includes receiving the network information identifier in a closed caption portion of the television signal.

4. The method of claim 3 further including the step of decoding the closed caption portion of the television signal to recover the network information identifier.

5. The method of claim 3 wherein the network information identifier is embedded in a text stream of the closed caption portion of the television signal and delimited by one or more predetermined characters.

6. The method of claim 1 wherein the step of supplying the network information identifier to a device which utilizes it to automatically retrieve information over the network further includes the step of supplying the network information identifier to a set-top box associated with a television set.

7. The method of claim 6 wherein the set-top box establishes a connection over the network with a server which delivers a web page for display on the television set along with a picture portion of the television signal.

8. The method of claim 6 wherein the set-top box includes a decoder for extracting the network information identifier from a closed caption portion of the television signal.

9. The method of claim 6 further including the step of displaying the retrieved information simultaneously with a picture portion of the television signal on the television set using a picture-in picture arrangement.

10. The method of claim 6 further including the step of permitting the viewer to select between display of the retrieved information and display of a picture portion of the television signal.

11. The method of claim 1 wherein the step of supplying the network information identifier to a device which utilizes it to automatically retrieve information over the network further includes the step of supplying the network information identifier to a computer.

12. The method of claim 11 further including the step of displaying the retrieved information on a display screen of the computer.

13. The method of claim 1 further including the step of preventing the retrieval and display of information corresponding to a particular network information identifier if the particular network information identifier has a predetermined form.

14. The method of claim 1 further including the steps of storing a plurality of received network information identifiers, and allowing the viewer to select one or more of the plurality of identifiers for which corresponding retrieved information will be displayed in conjunction with the television signal.

15. An apparatus for accessing information over a computer network, comprising:

a decoder for processing at least one network information identifier transmitted with a television signal; and a display device coupled to an output of the decoder and receiving at least a portion of the television signal therefrom, wherein the network information identifier is utilized to automatically retrieve information over the network, such that the recieved information is displayed to a viewer in conjunction with a display on the display device of related programs in the television signal, and the viewer is permitted to select continued display of currently-displayed retrieved information corresponding to a particular network information indentifier, and wherein selection of continued display of the currently-displayed retrieved information automatically interrupts display of additional retrieved information corresponding to at least one subsequently-received network information identifier.

16. The apparatus of claim 15 wherein the network information identifier is a Uniform Resource Locator (URL) identifying a web site.

17. The apparatus of claim 15 wherein the decoder is a closed caption decoder which extracts the network information identifier from a closed caption portion of the television signal.

18. The apparatus of claim 17 wherein the network information identifier is embedded in a text stream of the closed caption portion of the television signal and delimited by one or more predetermined characters.

19. The apparatus of claim 15 wherein the display device is a television set and the decoder is part of a set-top box associated with the television set.

20. The apparatus of claim 19 wherein the set-top box establishes a connection over the network with a server which delivers a web page for display on the television set along with a picture portion of the television signal.

21. The apparatus of claim 19 wherein the retrieved information is displayed on the television set simultaneously with a picture portion of the television signal, using a picture-in-picture arrangement.

22. The apparatus of claim 20 wherein the set-top box permits the viewer to select between display of the retrieved information and display of a picture portion of the television signal.

23. The apparatus of claim 15 wherein the decoder supplies the network information identifier to a computer which utilizes it to automatically retrieve information over the network.

24. The apparatus of claim 23 wherein the display device on which the related programming is displayed is a television set, and the retrieved information is displayed on a display screen of the computer.

25. The apparatus of claim 15 wherein the decoder prevents the retrieval and display of information corresponding to a particular network information identifier if the particular network information identifier has a predetermined form.

26. The apparatus of claim 15 further including a memory for storing a plurality of received network information identifiers, wherein the viewer is permitted to select one or more of the plurality of identifiers for which corresponding retrieved information will be displayed in conjunction with the television signal.

27. The apparatus of claim 19 wherein the set-top box is configured to allow the viewer to select continued display of the retrieved information corresponding to a particular network information identifier.

28. The apparatus of claim 15 wherein the decoder is implemented in a tuner card in a computer.

29. The apparatus of claim 28 wherein a television picture generated by the tuner card is displayed in one window on a display screen of the computer, and the retrieved information is displayed in another window on the display screen.

30. An apparatus for accessing information over a computer network, comprising:

means for receiving at least one network information identifier transmitted with a television signal;

means for supplying the network information identifier to a device which utilizes the network information identifier to automatically retrieve information over the network, such that the retrieved information is displayed to a viewer in conjunction with related programming in the television signal; and means for allowing the viewer to select continued display of currently-displayed retrieved information corresponding to a particular network information identifier, wherein selection of a continued display of the currently-displayed retrieved information automatically interrupts display of additional retrieved information corresponding to at least one subsequently-received network information identifier.

31. An apparatus for accessing information over a computer network, comprising:

means for processing at least one network information identifier transmitted with a television signal, such that the network information identifier is utilized to automatically retrieve information over the network; and means for displaying the retrieved information to a viewer in conjunction with related programming in the television signal, such that the viewer is permitted to select continued display of currently-displayed retrieved information corresponding to a particular network information identifier, wherein selection of continued currently-displayed retrieved information automatically interrupts display of additional retrieved information corresponding to at least one subsequently-received network information identifier.

32. A method of accessing information over a computer network, comprising the steps of:

receiving a sequence of network information identifiers transmitted with a television signal;

supplying the network information identifiers to a device which utilizes the network information identifiers to retrieve information over the network, such that the retrieved information is displayed to a viewer in synchronization with related programming in the television signal; and allowing the viewer to select continued display of currently-displayed retrieved information corresponding to a particular network information identifier, wherein selection of continued display of the currently-displayed retrieved information automatically interrupts display of additional retrieved information corresponding to at least one subsequently-received network information identifier.

33. An apparatus for accessing information over a computer network, comprising:

a receiver for receiving a sequence of network information identifiers transmitted with a television signal; and a display for displaying network information retrieved using the network identifiers, wherein the retrieved information is displayed to a viewer in synchronization with related programming the television signal, and the viewer is permitted to select continued display of currently-display retrieved information corresponding to a particular network information identifier, and further wherein selection of continued display of the currently-displayed retrieved information automatically interrupts display of additional retrieved information corresponding to at least one subsequently-received network information identifier.

34. A method of accessing information over a computer network, comprising the steps of:

receiving at least one network information identifier transmitted with a television signal;

supplying the network information identifier to a device which utilizes the network information identifier to automatically retrieve information over the network, such that the retrieved information is displayed to a viewer in conjunction with related programming in the television signal; and preventing the retrieval and display of information corresponding to a particular network information identifier if the particular network information identifier has a designated predetermined form.

35. An apparatus for accessing information over a computer network, comprising:

a decoder for processing at least one network information identifier transmitted with a television signal; and a display device coupled to an output of the decoder and receiving at least a portion of the television signal therefrom, wherein the network information identifier is utilized to automatically retrieve information over the network, such that the retrieved information is displayed to a viewer in conjunction with a display on the display device of related programming in the television signal, and wherein the decoder prevents the retrieval and display of information corresponding to a particular network information identifier if the particular network information identifier has a designated predetermined form.

* * * * *